(12) United States Patent
Bauman et al.

(10) Patent No.: US 6,981,144 B2
(45) Date of Patent: Dec. 27, 2005

(54) SYSTEM CONSOLE DEVICE AUTHENTICATION IN A NETWORK ENVIRONMENT

(75) Inventors: Mark Linus Bauman, Rochester, MN (US); John Joseph Bird, Rochester, MN (US); Jeffrey Earl Remfert, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 09/828,548

(22) Filed: Apr. 6, 2001

(65) Prior Publication Data

US 2002/0152377 A1 Oct. 17, 2002

(51) Int. Cl.[7] .............................................. H04L 9/00
(52) U.S. Cl. ...................... 713/168; 713/169; 713/713; 713/170; 713/176; 713/161; 713/155; 713/183; 713/172; 380/229; 380/380; 380/232; 707/9; 707/707; 707/10
(58) Field of Search ................................. 713/168, 169, 713/170, 176, 161, 171; 380/229, 232; 707/9, 707/10

(56) References Cited

U.S. PATENT DOCUMENTS

| | | | | |
|---|---|---|---|---|
| 5,241,599 A | * | 8/1993 | Bellovin et al. | ............. 713/171 |
| 5,276,863 A | * | 1/1994 | Heider | ........................ 709/222 |
| 5,434,918 A | | 7/1995 | Kung et al. | |
| 5,638,448 A | | 6/1997 | Nguyen | |
| 5,655,077 A | | 8/1997 | Jones et al. | |
| 5,689,566 A | | 11/1997 | Nguyen | |
| 5,768,504 A | | 6/1998 | Kells et al. | |
| 5,774,650 A | | 6/1998 | Chapman | |
| 5,999,711 A | | 12/1999 | Misra et al. | |
| 6,029,246 A | | 2/2000 | Bahr | |
| 6,044,155 A | | 3/2000 | Thomlinson et al. | |
| 6,233,577 B1 | * | 5/2001 | Ramasubramani et al. | .... 707/9 |
| 6,263,437 B1 | * | 7/2001 | Liao et al. | ................... 713/169 |

OTHER PUBLICATIONS

I/O Concepts, Console Consolidation System OverView, I/O Concepts, pp. 1-4, 2000 ☐☐http://www.ioconcept.com/sales/0011-ccs-overview-10-18-2000.pdf.*

* cited by examiner

Primary Examiner—Justin T. Darrow
Assistant Examiner—Samson B. Lemma
(74) Attorney, Agent, or Firm—Bracewell & Patterson, LLP

(57) ABSTRACT

A method for providing secure access to console functions of a computer system and authentication of a console device is disclosed. The method comprises first initiating a first EKE sequence to generate a unique shared secret per device utilizing a default device identifier and associated default shared secret on a system-attached device from which a console operation is desired to be enabled. Then, a shared secret is generated from the first EKE sequence, and the generated shared secret is utilized in place of the default device shared secret in subsequent console authentication procedures for that device. Following, the shared secret is securely stored within a storage location of the system and on the system-attached device. The device's shared secret is subsequently replaced on each connection from that device.

27 Claims, 9 Drawing Sheets

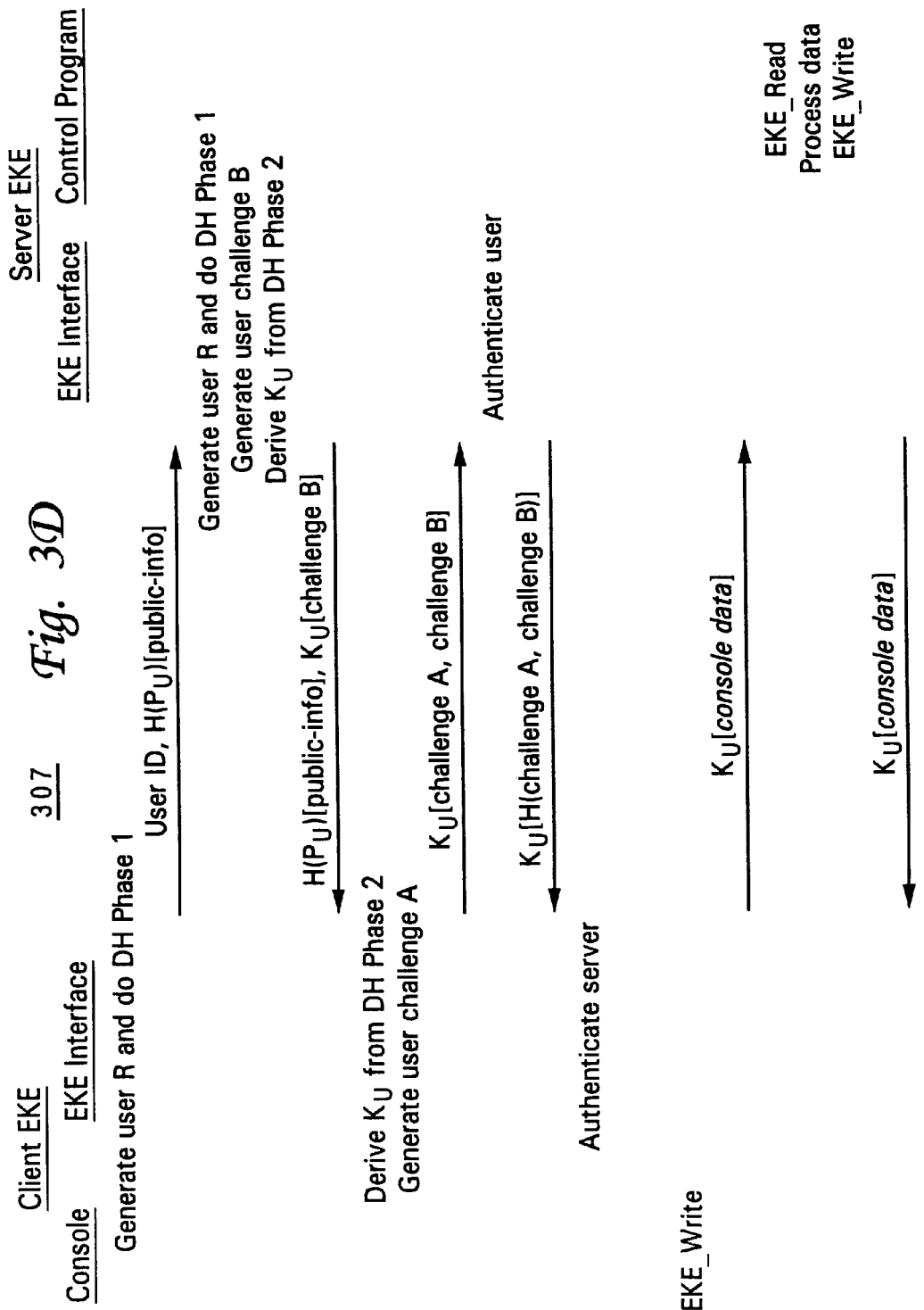

SYSTEM CONSOLE DEVICE AUTHENTICATION IN A NETWORK ENVIRONMENT

BACKGROUND OF THE INVENTION

1. Technical Field

The present invention relates in general to computer system and in particular to accessing console features of a networked computer system. Still more particularly, the present invention relates to a method and system for improved security access for console devices and/or console device features of a networked computer system.

2. Description of the Related Art

Computer networks or multi-user computer systems are common in today's business environment and may range from small, localized, local area networks (LANs) to larger, geographically, dispersed wide area networks (WANs), such as the Internet. Irrespective of the type and size of network, the network setup, control, and maintenance are usually performed by operators or administrators having specialized access and utilizing specialized console devices.

Multi-user computer systems typically support a system console mode of operation that is used by the system administrator to setup and manage the computer system. System administrator functions include installing software applications, installing software updates (and fixes), performing file backup and restore operations, managing security controls, and giving new users access to applications and system resources. The console mode of operation runs either separately (in the case of initial setup) or concurrently with user applications. The console mode of operation can also be utilized by service personnel to perform service functions and problem determination.

Typically, console functions are restricted to designated console operators. The restriction to designated operators provides added security to the computer system and ensures the integrity of the system. Access to the console operations is controlled by the "system console control program", which authenticates a console operator. The operator is required to enter a user-identifier (user ID) and his/her associated password.

Typically, to ensure added security and integrity, console functions are allowed and supported only on particular devices (e.g., keyboard/display terminals or workstations) that may be located in a protected, controlled physical environment. These console devices have simple command line and/or text menu interfaces because of the limited resources of the system console control program during early phases of system initialization and setup and when performing service functions. For example, iSeries™ console devices connect to the system via a twinaxial serial port or an asynchronous RS-232 serial port. These types of connectivity also require the console device to be in close physical proximity to the system. Additionally, some systems (e.g., iSeries™) support multiple-logical system partitions, where each partition requires its own console device.

Present mechanisms used to protect console functions do not identify and authenticate the device from which the console function request is being made. These other mechanisms rely upon physical controls such as special connectivity (i.e., a special communication cable, such as a TWINAX connection) or special physical device controls (i.e. the device accessing the console functions has to be located in a secure room in close physical proximity to the system) or an identity scheme based on the unique burned-in identifier in the console device's network adapter card (which can be shared among systems and is not secure). These restrictions in present mechanisms limit the capabilities of allowing access to the console functions and thus reduce the security, usability, and functionality of the system.

With the widespread use of LANs, there is a growing need to provide more flexibility in attaching and supporting console devices in a networked environment. Thus, system administrators do not want specialized devices, which require special communications ports (with corresponding cable length restrictions) to perform system console functions. Instead, system administrators want to utilize LAN-attached PCs or, in the more general case, network-attached devices to provide console support.

Providing console support on network-attached devices enables a wider selection in the types of devices that may be utilized and allows greater flexibility in the physical placement or location of the device. Also, network-attached devices (in the case of personal computers) are capable of running multiple console sessions (e.g., one session for each system in the network or for each logical partition in a system). However, capitalizing on the flexibility of allowing console operations from any network-attached device exposes potentially serious security issues, including:

a. restricting console functions to a particular device (i.e., a system administrator may still require that a console device be located at a particular location on the physical premises);

b. passing a user-id and associated user-id password to authenticate the console operator over an insecure network;

c. console session data passing across an insecure network un-encrypted and available to be viewed by unauthorized persons; and d. ensuring that the integrity of the console session data is maintained (i.e., not modified) when flowing across the network.

There are some user-authentication methods being presently utilized such as described in U.S. Pat. No. 5,434,918. However, these methods focus specifically on user-to-server authentication and do not provide any solution to issues of continuing console device authentication and preserving data integrity during console operations.

The present invention thus recognizes that it would be desirable to provide a method and system for enhancing security of access to console operations from network-attached console devices. The invention recognizes that it would be desirable to enable authentication of a device to be utilized as a console device. The invention further recognizes that it would be desirable to enable secure transmission of console functions and/or sessions data to and from a network-attached device. These and other benefits are provided in the present invention.

SUMMARY OF THE INVENTION

A method for providing secure access to console functions of a computer system and authentication of a console device is disclosed. The method comprises first initiating a first Encrypted Key Exchange (EKE) sequence to generate a unique shared secret per device utilizing a default device identifier and associated default shared secret on a system-attached device from which a console operation is desired to be enabled. Then, a shared secret is generated from the first EKE sequence, and the generated shared secret is utilized in place of the default device shared secret in subsequent console authentication procedures for that device. Following, the shared secret is securely stored within a storage location of the system and on the system-attached device. The device's shared secret is subsequently replaced for each connection from that device.

The shared secret is stored in a protected manner on the system-attached device and utilized as the device shared secret during each connection of said system-attached device to said system. Following the first EKE sequence, operator authentication data flowing between said system-attached device and the system are encrypted utilizing the shared secret.

When the first console session is established and the system-attached device is authenticated, then a second EKE sequence is initiated to authenticate a console operator utilizing a default user identifier and password. The user identifier and password are stored in a protected area of said storage location of said system and are not stored on the system-attached device.

In operation, multiple device identifiers and associated shared secrets and authorization levels for other system-attached devices to act as console devices may be implemented. The multiple device identifiers and authorization levels are stored in a special secure system storage location. Additionally, multiple operator user identifiers and associated passwords and authorization levels for other console operators to access console functions of the system may be established. These multiple operator user identifiers and associated passwords and authorization levels are also stored in a special secure storage location. Thus multiple console sessions for different systems are enabled on a single console device. Also, each console device may be a console for multiple machines, each server may have multiple connected console devices, and each console device may have multiple users.

The invention accomplishes four major goals: (1) restricting console function to a particular device via device authentication; (2) securely passing a user-id and associated user-id password to authenticate the console operator; (3) protecting console session data from being viewed by unauthorized persons; and (4) ensuring that the integrity of the console session data is maintained (i.e., not modified) when flowing across the network.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 3A–3D illustrate a series of authentication procedures between a network-attached console device and system server in accordance with a preferred implementation of the present invention;

DETAILED DESCRIPTION OF THE PREFERRED EMBODIMENT

Figure 1:
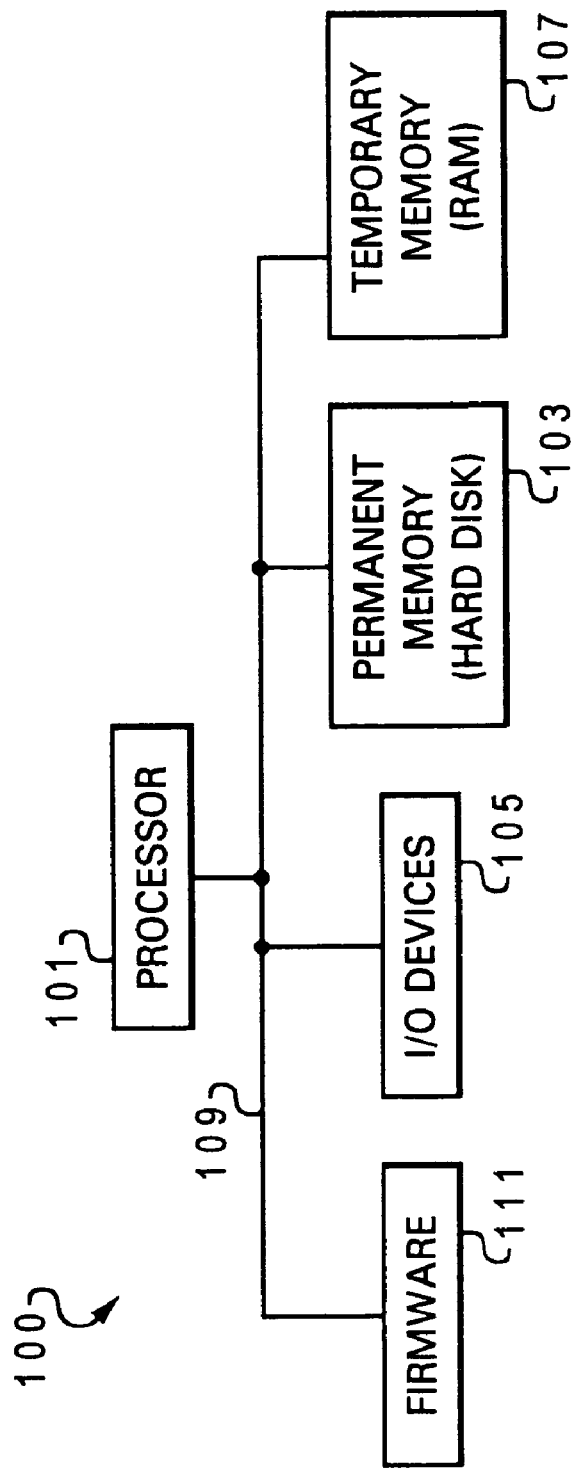
FIG. 1 depicts a block diagram of major components of a data processing system, in which a preferred embodiment of the present invention may be implemented.

The present invention is directed to a method and system for providing secured authentication for access to console operations on a network via network-attached devices utilized as console devices. The network-attached device may be a standard data processing system as illustrated in FIG. 1, and the network may comprise server-connected devices as provided in FIG. 2. The invention may, however, be implemented in other types of data processing systems and network configurations and, while the present invention may be described with reference to the provided figures, these references should not be construed in a limiting sense.

The present invention makes use of the encrypted key exchange (EKE) algorithm described in United States Patent (U.S. Pat. No. 5,241,599) entitled "Cryptographic Protocol For Secure Communications," the relevant content of which is hereby incorporated by reference. It is to be understood, however, that the invention may be implemented with other similar encryption algorithms including algorithms yet-to-be developed that utilize the basic framework or functionality of the EKE algorithm, and the references herein to a specific EKE algorithm should not be construed as limiting the invention to only that algonthm.

With reference now to the figures and in particular with reference to FIG. 1, a high level block diagram of the major component parts of a data processing system that may be utilized as a network-attached device (or console device) or a network server is presented. Data processing system 100 comprises a Central Processing Unit (CPU) 101. CPU 101 is coupled to system memory 103, which may be a flash memory in some devices, peripheral input/output (I/O) devices 105, firmware 111, and temporary memory 107 via interconnect 109. Stored within memory devices are the operating system (OS) and software code or logic by which many of the processes of the invention (e.g., authentication via EKE encryption) may be completed may be implemented as will become clear later. During operation, the software code or logic is executed by CPU 101 in system memory 103 utilizing operator-inputted data (e.g., device ID, device shared secret, and user authentication ID, etc.) The operator interfaces with data processing system 100 (and network) via I/O devices 105.

Among the I/O devices connected to the CPU may be keyboard, mouse, CD ROM, and display monitor. A display monitor provides a graphical user interface (GUI), which allows a user to view and interact with the console authentication software applications stored in system memory or provided via a network, by displaying icons or other selectable mechanisms with which the user may interact.

Also coupled to CPU are various external devices (not shown). These external devices may include a modem and/or a network adapter utilized to connect data processing system 100 to other systems and/or networks, as is illustrated in FIG. 2.

In one embodiment a modem may be utilized to connect data processing system 100 to a network server via remote access protocols. In yet another embodiment, a network adapter is utilized to connect data processing system 100 or 207 to a Local Area Network (LAN) as depicted in FIG. 2.

Figure 2:
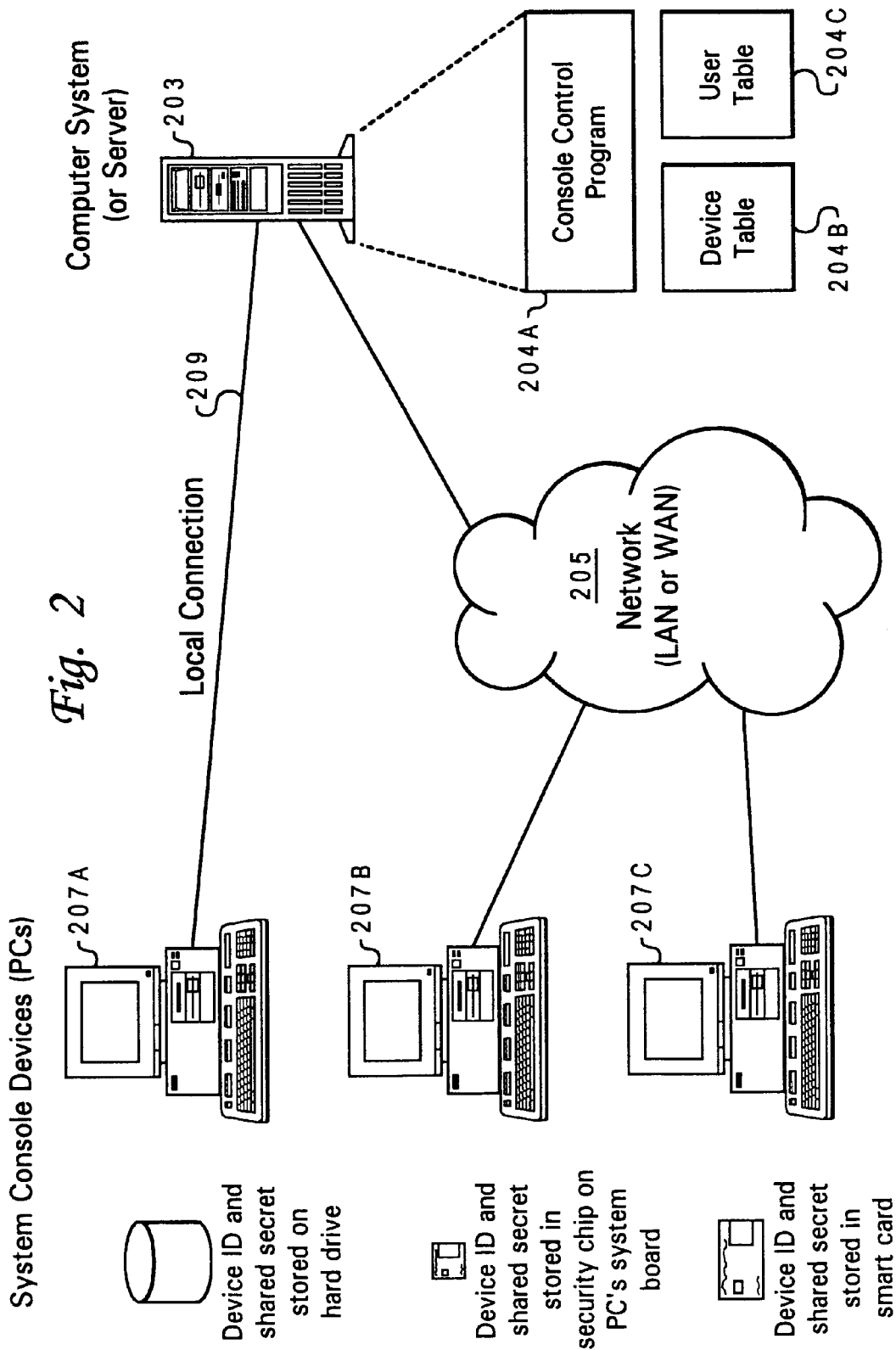
FIG. 2 depicts a network with attached console devices within which a preferred embodiment of the present invention may be implemented.
Figure 3A:
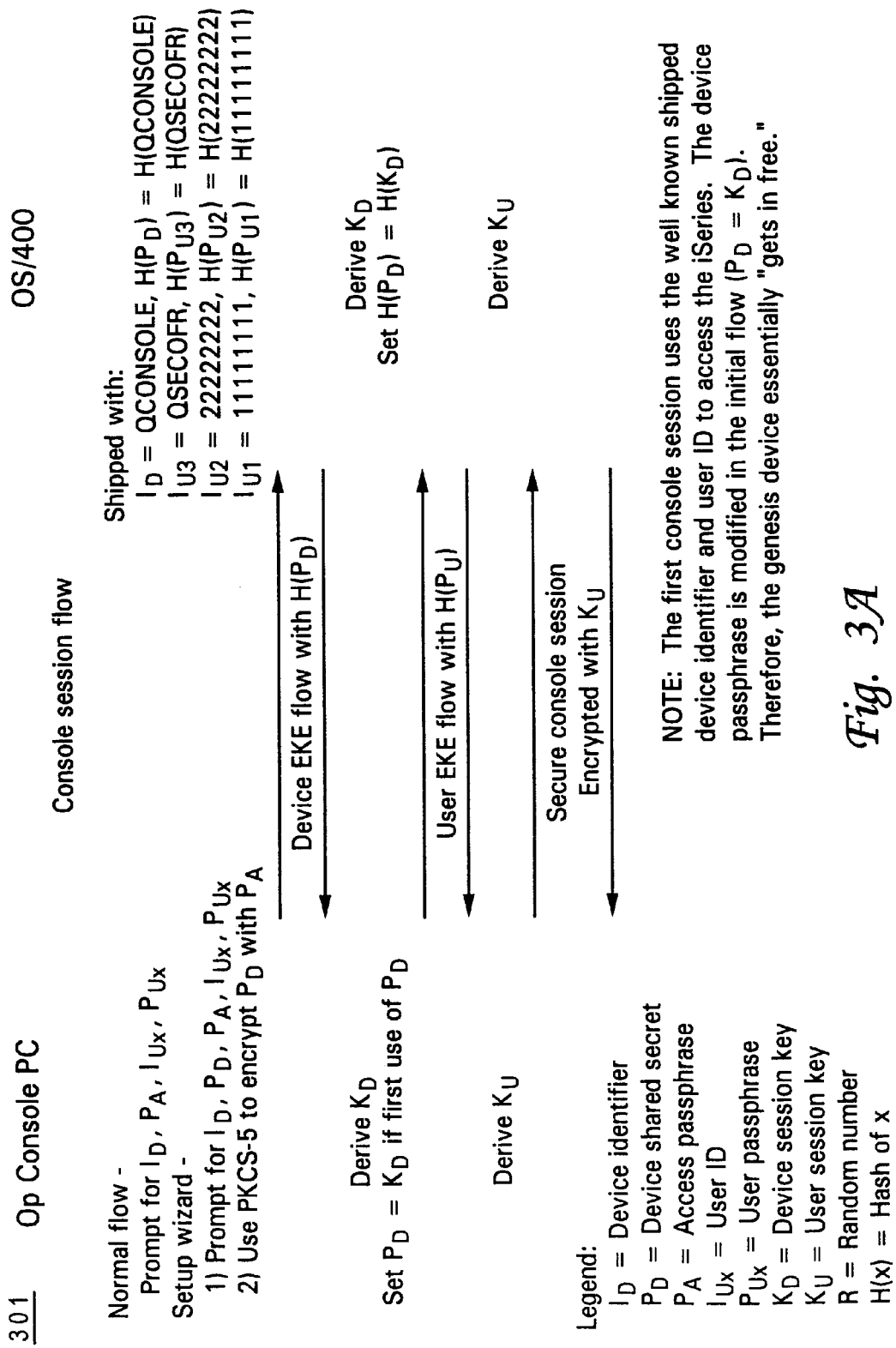
Figure 3B:
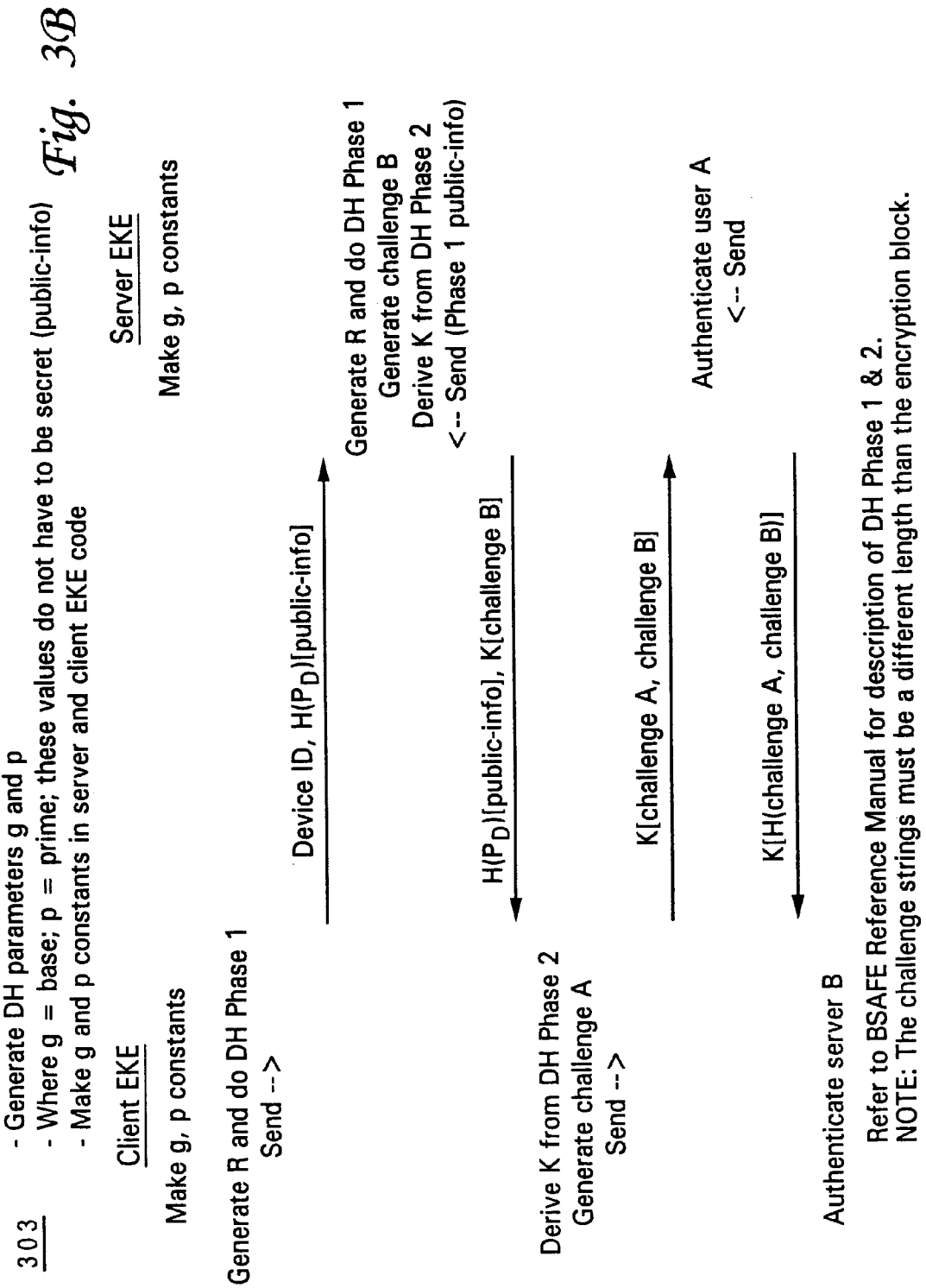
Figure 3C:
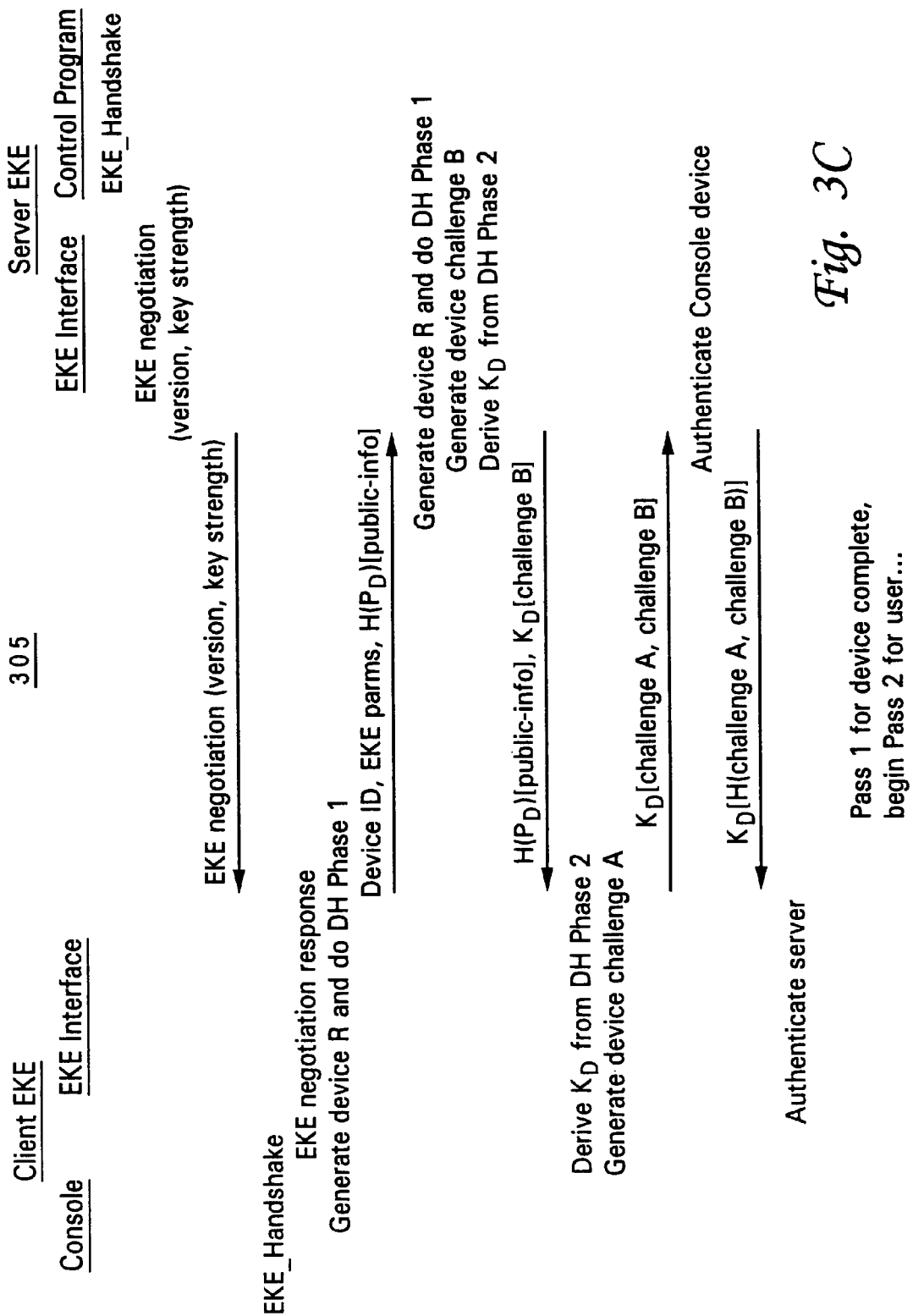

Referring now to FIG. 2, a high-level block diagram of a server-client based network is illustrated in accordance with a preferred embodiment of the present invention. The network may consist of a single server or a number of servers and provides network clients with a means of communicating and transferring software and information electronically within the network environment.

The preferred embodiment of the present invention is concerned with the controlling of access to system console functions on a network using an authentication procedure that not only authenticates the operator each time he/she accesses the console program and the device but also encodes data transmitted during the console session to prevent unauthorized access or interception. As illustrated, network devices comprise a computer system (or server) 203 that includes console control program 204A, device table 204B, and user table 204C. Application of device table 204B and user table 204C are described further below. Connected to server 203 are three client systems 207A–207C. Client systems 207A–207C comprise data processing system 100 illustrated in FIG. 1, and may each be utilized as a system console device in the present invention. Client system A 207A is directly connected to server 203 via local connection 209. Client systems 207B, 207C are connected to server 203 via a network 205, which may be a LAN or WAN. Connection between server 203 and client systems 207B, 207C may be via direct access (e.g., an ethernet with connection lines) or remote access (e.g., wireless access).

As illustrated, client system A 207A includes a hard drive on which is stored the device ID and associated shared secret utilized by the authentication process described below. Client system B 207B stores the device ID and associated shared secret in a security chip on the system board of the data processing system, while client system C 207C stores its device ID and associated shared secret in a smart card. Illustration of the various storage areas of the device ID and associated shared secret is meant only to indicate some of the possible storage locations and not meant to be exhaustive of the possible storage locations.

Network server 203 in the present embodiment is a data processing systems having a database, OS, and server software. The preferred embodiment is implemented with an iSeries server manufactured by International Business Machines, Inc. Each client system is also a data processing system with OS and client software stored locally in memory. Client systems being utilized as console devices also have console device activation software to support sign-in authentication procedures. Client systems utilized as console devices have input mechanisms and visual output mechanism, such as a monitor, by which a system administrator may manage the network. Those skilled in the art appreciate that the network as illustrated herein is a basic network and that even more complex networks, such as those with multiple servers and large numbers of client systems (and/or console devices) and multiple interconnecting networks are contemplated within the scope of this invention.

The invention consists of three main functional elements, which, when combined, provide system administrators with the ability to control and restrict access to console operations to specific devices and operators in a networked environment, such as illustrated in FIG. 2, when operating in either a limited functional environment or a fully functional environment. Accordingly, in the preferred embodiment, only an authorized and authenticated device and an authorized and authenticated operator are provided access to console operations in the networked environment.

FIGS. 3A–3D illustrates a series of information blocks within the authentication procedure of the invention, which is described below with reference to the flow charts of FIGS. 4A and 4B. Directional arrows in FIGS. 3A–3D indicate the exchange of information between the console device and the system as the authentication procedure and later transfer of session data occurs.

Figure 4A:
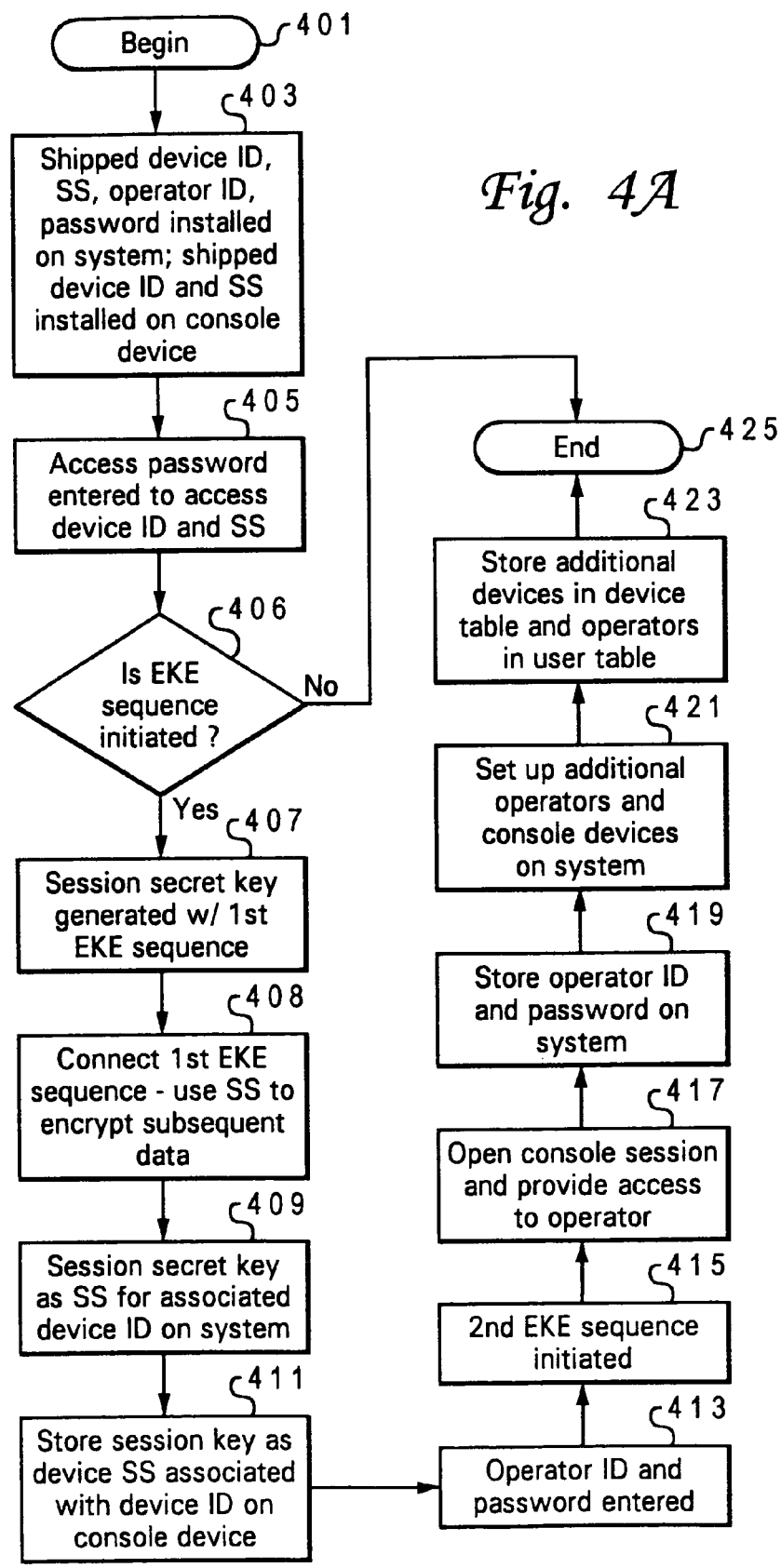
FIGS. 4A and 4B are high level logical flow charts depicting the processes of providing access authentication in accordance with preferred implementations of the present invention.

FIG. 4A is a flow chart illustrating the process of establishing and implementing a secured authentication procedure according to the present invention. The process begins at block 401 and thereafter proceeds to block 403 where default values for the device identifier, shared secrets and operator ID and password are shipped with the system and device identifier and secret with the console device. During initial setup, the operator enters the device identifier and associated shared secret and access password to initiate an EKE sequence between a network-attached console device and the system, as shown at block 405. A determination is made at block 406, whether the entered values initiates an EKE sequence. Entering correct default values establishes the first console session to the system from an authenticated device. In the preferred embodiment, only the initial console device may access the system using the default device identifier and associated shared secret. When an EKE sequence is initiated, a session secret key is generated as shown at block 407. The result (i.e., session secret key) of the EKE sequence is utilized as a shared secret key, which replaces the initial default device shared secret as shown in block 409. The new device shared secret is stored in protected storage on the system and is also stored as the device shared secret on the network-attached console device in a protected manner for use when the device next establishes a connection to the system as shown in block 411.

When the network-attached console device next attempts to connect to the system, the stored device identifier and associated shared secret on the network-attached console device is utilized to complete the first EKE sequence. In one embodiment, the shared secret that is generated as part of the first EKE handshake is utilized as illustrated at block 408 to encrypt the data that will subsequently flow on the connection, namely, the authentication process for the console operator attempting to utilize a console function.

Returning to FIG. 4A, a second EKE sequence is used to authenticate the console operator. As with the device ID, a user-id and password is also shipped with the system. The operator enters this user-id and associated password to initiate the second EKE sequence at block 413, which initiates a second EKE sequence at block 415. The second EKE sequence establishes a console session at the operator level as shown at block 417. In the preferred embodiment, only the initial operator can access the machine using the default user-id. Once that initial console session is established, the operator then enters the user-id and password that is to be used for future access by the operator(s) to the console operations. The new operator user-id and password are stored on the system in protected storage at block 419, but are not stored on the console device.

After the initial device and operator have established the initial console session with the system, the system administrator (e.g., typically the initial operator) is able to set up initial device identifiers and associated shared secrets and authorization levels for other devices the administrator desires to act as console devices as depicted at block 421. These device identifiers and associated shared secrets and authorization levels are stored in a device table 204B as shown at block 423. In the preferred implementation, the system administrator also sets up initial operator user-ids and associated passwords and authorization levels for other console users to access console functions. These operator user-ids, passwords, and authorization levels are stored in the user table 204C. The process then ends at block 425. The stored information are illustrated in FIGS. 5A and 5B.

Figures 5A, 5B:
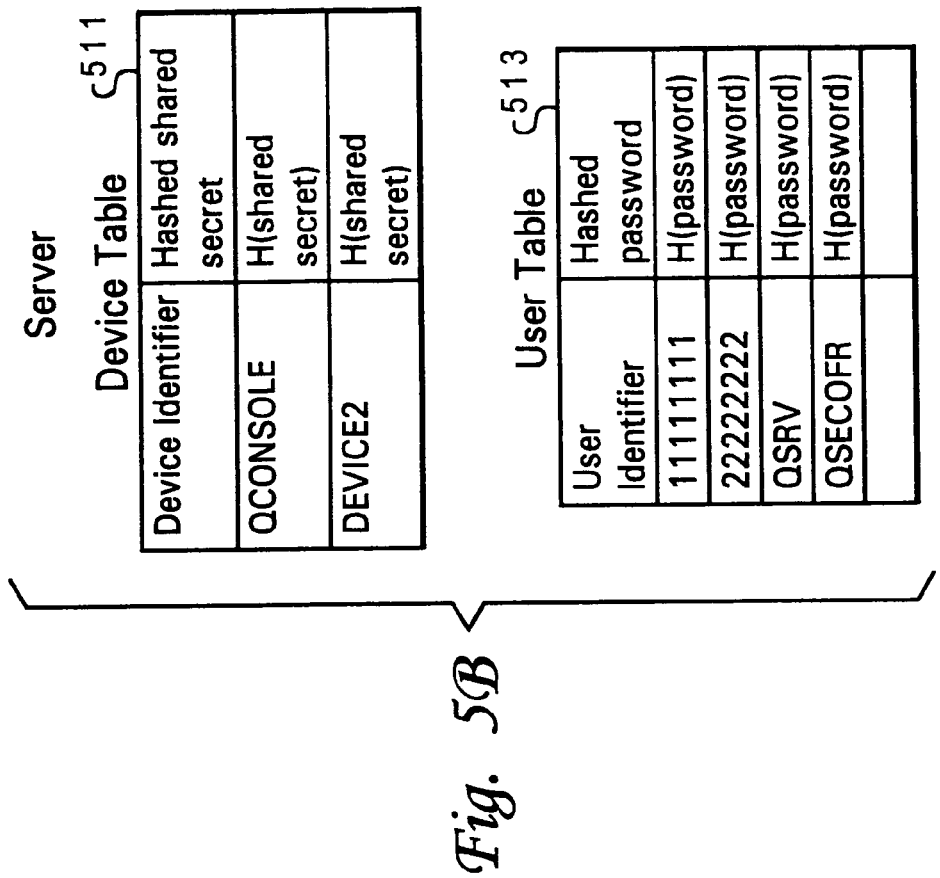
FIGS. 5A and 5B illustrate high level block diagrams of a client and server device configuration in accordance with one embodiment of the present invention.

FIG. 5A illustrates a representative client device 501 with stored server connection information including the shared secret, i.e., hash with access password. FIG. 5B illustrates a representative server with stored device identifier, and shared secret, etc., in device table 511 and user identifiers and associated passwords in user table 513.

Figure 4B:
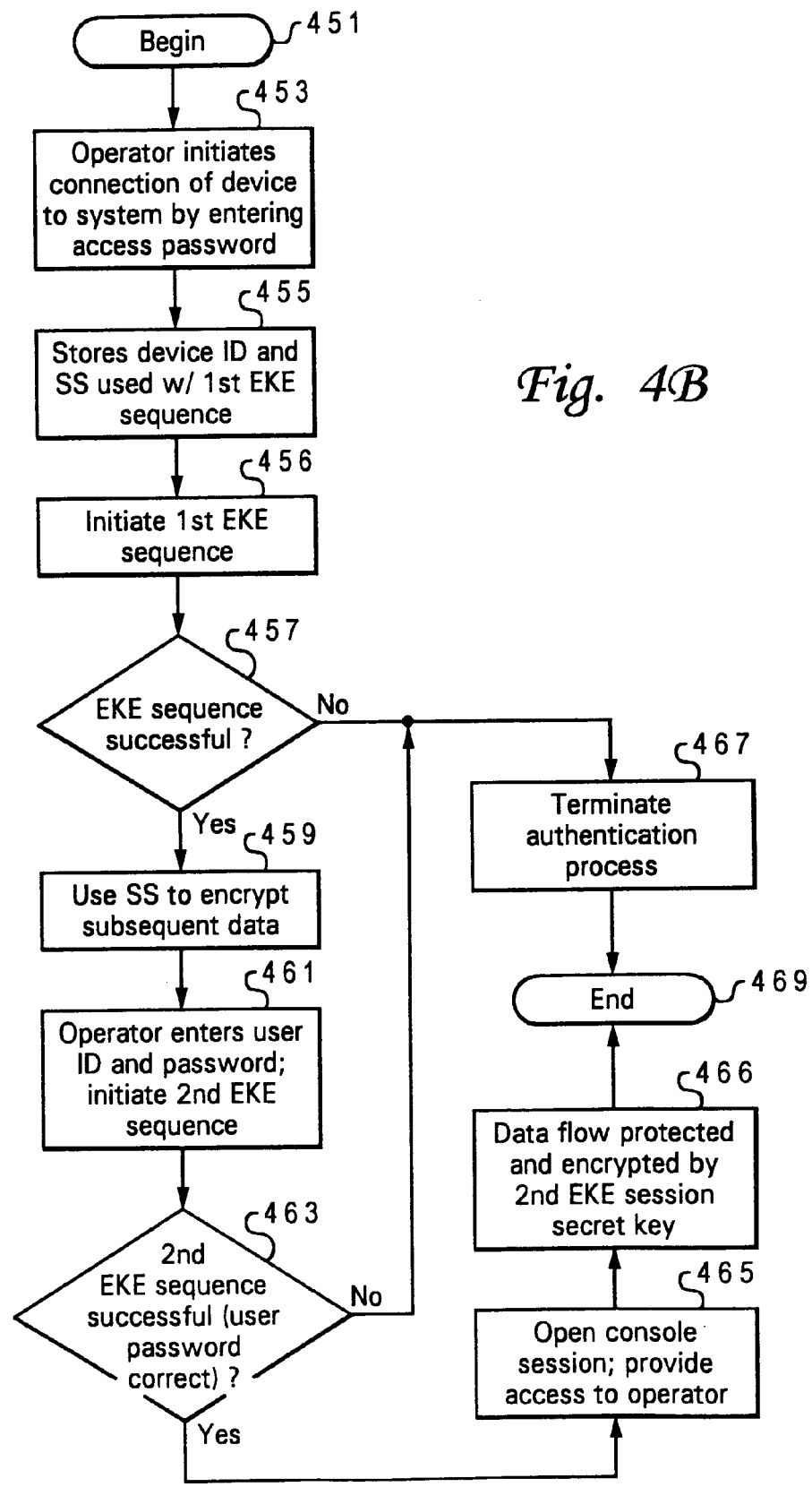

FIG. 4B illustrates one embodiment of the actual connection process after set-up of the console system as described above. Beginning at block 451, when the operator next attempts to connect to the system by entering the access password from the authorized network-attached console device as shown at block 453, the stored device identifier and associated shared secret on the console device are utilized for the first EKE sequence as depicted in block 455. Then the first EKE sequence is initiated as shown at block 456. A first determination is made at block 457 whether the first EKE sequence is successful, i.e., whether both ends of the attempted connection have identical shared secrets for the first EKE sequence. If not, access is denied (i.e., authentication process terminated) as shown at block 467, and the process ends at block 469. However, if both ends have identical shared secrets, then the first EKE sequence connects successfully as shown at block 459 and the shared secret is utilized to encrypt subsequent data.

Following, the operator enters the operator user-id and password at block 461 to initiate the second EKE sequence. A next determination is made at block 463 whether the second EKE sequence is successful. If the second EKE sequence is unsuccessful, then access is denied at block 467 and the process ends at block 469. Otherwise, if the second EKE sequence is successful, then the device and operator are given access to the system's console functions as illustrated in block 465. During operation, the operator's user-id and password are encrypted with the shared secret that is the result of the first EKE sequence. Additionally, the shared secret of the second EKE sequence is used to encrypt the data flowing over connection after the operator obtains access to the console functions as shown at block 466.

Those skilled in the art understand that the above processes are presented as steps which are completed primarily by program code executed on the system and on the network-connected device. Different process steps may be provided and in a different order than that of FIGS. 4A and 4B. The steps as presented are meant to illustrate only one possible representation of the invention and are not meant to be limiting on the invention in any way.

Thus, each console device may be a console for multiple machines, each server may have multiple connected console devices, and each console device may have multiple users. As described generally above, the inventions provides three main functional features, including: 1. secure device authentication; 2. dual authentication protocol using EKE; and 3. replacement of the initial device shared secret with the device session key. These features and their benefits are further explained below.

1. Secure Device Authentication

Device authentication is provided with the EKE algorithm whereby an initial shared secret is utilized and then the initial shared secret is replaced with an EKE-generated shared secret. The EKE-generated shared secret is unique to the device that generates it and unique for the system the device is being attached to. In the preferred embodiment, the shared secret generated from the EKE sequence is not provided to the operator at the console device or to any system operator. Thus, device authentication is subsequently accomplished (after the initial session) without the operator on the network-attached console device knowing the device identifier.

The method by which the device shared secret is protected on the network-attached console device is dependent on the security requirements established by the system administrator. In one embodiment, the device identifier and associated shared secret is stored encrypted, using a key that is based on a password specified by the operator. A next, more expensive embodiment that offers more security utilizes a PC-based console device that has an embedded smart chip, which provides encrypted and physically secure storage of the device identifier.

The invention utilizes a network cryptographic protocol to first authenticate a physical device for console operations and then to authenticate an operator. The authentication of the physical device and subsequent authentication of the operator allows the device from which the operator completes console functions to exist anywhere in the network, without restrictions on physical connections. The only restrictions are those configured by the system administrator for the device identification and authorization level.

Utilizing the device authentication features of the present invention makes it substantially impossible to spoof the authorized device to the system because the console device's shared secret can be stored in protected secure hardware (e.g., IBM, Inc.'s 300PL PC with integrated security chip). Even if the shared secret is stored encrypted on local media, spoofing the device is still nearly impossible since the spoofer has to retrieve the stored encrypted device shared secret and any values used for encryption and decryption of the shared secret (salt value, etc.) from that specific device.

2. Dual Authentication Protocol

Dual authentication protocol is a limited functional mode using EKE. The invention incorporates a novel use of EKE to first authenticate the network attached physical device and then authenticate the operator. As described above, the dual authentication protocol utilizes the first EKE sequence to authenticate the network attached console device and to generate a secret key, and then uses a second EKE sequence to authenticate the console operator. The shared secret that is generated as part of the first EKE handshake is used to encrypt and decrypt the data that will subsequently flow on the connection, i.e., the authentication process for the console operator attempting to use a console function. The secret key from the second EKE sequence is used to encrypt and decrypt session data flowing between the console device and the system.

The process ensures that the device from which the request to use console operations is made is first authenticated and that the console operator requesting console operations from that device is also authenticated, i.e., a dual authentication process. An important aspect of this dual authentication protocol using EKE is that console functions operate with a system that is in a limited functional or resource capability mode (i.e., at the beginning of installing a new operating system on the system). Using EKE and its light weight infrastructure allows the authentication with limited mode to occur.

The invention offers significant functional and usability advantages over existing solutions. The functional advantages include: (1) the system being attached to by the device can be in a limited functional mode and still be able to utilize the invention's defined protocol flow to authenticate and secure the conversations between the device and the system; (2) the novel use of EKE for device and user authentication requires fewer system resources than using a first method to authenticate the device and then another method to authenticate a user; and (3) EKE easily fits into and operates in a bootstrapped or limited system resource environment.

The third factor above is an important factor as a console must operate with a system that is in a limited resource capability. The present invention is easier to use due to the minimum configuration associated with using a protocol such as Secure Socket Layer (SSL), which usually requires a digital certificate for each end point of the conversation, key ring support and access, and all of the associated certificate infrastructure.

3. Replacing the Initial Device Shared Secret with the Device Session Key

The present invention utilizes a unique method to strengthen the initial network attached console device's shared secret. The method's uniqueness is that it allows a first device connection using a simple, initial genesis device identifier (shared secret) to a system from a network-attached device, to be replaced by the device session key that is negotiated from the first EKE sequence. Then the device session key of the first EKE sequence is utilized for future connections (authentication) from that specific network-attached console device. Further, the device shared secret is constantly updated each time the associated device establishes a session to the system. Thus, the initial shared secret is replaced by a much more robust and strengthened shared secret. The new strengthened shared secret is more robust because it is longer in bit length, it is more randomly generated per the EKE sequence, and it is not exposed to the operator at the network-attached device or to any other system operator.

This unique method thus magnifies the strength of the initial device shared secret. In the preferred embodiment, the new device shared secret is only known to the server and console that created it as part of the EKE flow, i.e., the new device shared secret is not known to any user or any other device. This operation will magnify the strength of the device key. There will be more entropy in the session key than in the initial shared secret that most users will use since the initial shared secret will follow password rules that users have used in the past. Thus, the initial shared secret will usually consist of 8 or less alpha numeric characters. Therefore, a 128 bit (16 byte) session key will have more entropy.

One significant benefit of the present invention is that the invention allows multiple systems, including logical partitions, to be managed from a single device. Using and relying upon the security and usability features of this invention, a device may be configured to access multiple systems and be able to use console operations on each of those systems. This eliminates the need of having one console device per system (or per logical system partition). Overall, the invention provides for greater security and integrity of the network-attached device identifier and subsequently increases the security of the system.

Finally, It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as Read Only Memories (ROMs) or Erasable, Electrically Programmable Read Only Memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for providing secure access to console functions of a computer system comprising:

initiating a first EKE sequence between a console device and a network-accessible system to authenticate the console device as being authorized to connect to the network-accessible system to allow user access to the network-accessible system, wherein the first EKE sequence includes checking whether a device shared secret generated during a previous access of the console device with the network-accessible system matches an associated shared secret stored on the network-accessible system to which a console operation is desired enabled;

when the device shared secret matches the associated shared secret, initiating a second EKE sequence between the console device and the network-accessible system to authenticate a userID and password of the user of the console device; and preventing access to the network-accessible system when either the first EKE sequence or the second EKE sequence fails to authenticate, wherein a dual authentication procedure is implemented before any access is permitted by a user to the network-accessible system.

2. The method of claim 1, further comprising:

generating the device shared secret via an initial EKE sequence utilizing a default device identifier and associated default shared secret during an initial setup of the console device for connecting to the network-accessible system, wherein said device shared secret is utilized in place of said default device shared secret in subsequent console authentication procedures; and storing said device shared secret within a secure storage location of said network-accessible system; and passing a copy of the device shared secret to the console device for secure storage therein, wherein said device shared secret is stored in a secure location on said console device and utilized along with a device ID of the console device during each subsequent connection of said console device to said network-accessible system.

3. The method of claim 1, further comprising encrypting and decrypting a console operator's authentication data flowing between said console device and said network-accessible system utilizing a value selected from among said shared secret and a hash of said shared secret.

4. The method of claim 1, further comprising encrypting and decrypting subsequent session data flowing between said console device and said network-accessible system utilizing a value selected from among a second secret generated by the second EKE sequence or a hash of said second secret.

5. The method of claim 2, further comprising:
responsive to an establishment of a first console session that authenticates said console device, instantiating a second EKE sequence to authenticate a console operator utilizing a default user identifier and password;
enabling an update of the default user identifier and password to a new user identifier and password; and
storing said new user identifier and password in a secure storage location of said network-accessible system only, wherein said new user identifier and password are not stored on the console device.

6. The method of claim 5, further comprising:
enabling a setup of multiple device identifiers and authorization levels for other devices to act as console devices;
storing said multiple device identifiers and authorization levels in said secure storage location; wherein said setup and storing of device identifiers and authorization levels are completed by an administrator of the network-accessible system; and
enabling multiple console sessions for different systems on a single console device.

7. The method of claim 5, further comprising:
enabling a setup of multiple operator user identifiers and associated passwords and authorization levels for other console operators to access console functions of the system; and
storing said multiple operator user identifiers and associated passwords and authorization levels in said secure storage location;
wherein said setup and storing of operator user identifiers, associated passwords and authorization levels are completed by an administrator of the network-accessible system.

8. The method of claim 2, wherein said passing a copy of the device shared secret further comprises one or more of:
when the console device includes an embedded smart chip, storing the copy of the device shared secret within the embedded smart chip, wherein the device shared secret is encrypted and maintained in a physically secure storage; and
storing the copy of the device shared secret in encrypted format within the secure memory region of the console device, wherein said encrypted format utilizes a key generated from an operator-specified password.

9. A system for providing secure access to console functions of a computer system, said system comprising logic encoded on a computer readable medium that when executed on a console device provides the following functions:
initiating a first EKE sequence between the console device and a network-accessible system to authenticate the console device as being authorized to connect to the network-accessible system to allow user access to the network-accessible system, wherein the first EKE sequence includes checking whether a device shared secret generated during a set-up of the console device with the network-accessible system matches an associated shared secret stored on the network-accessible system to which a console operation is desired enabled;
when the device shared secret matches the associated shared secret, initiating a second EKE sequence between the console device and the network-accessible system to authenticate a userID and password of the user of the console device; and
preventing access to the network-accessible system when either the first EKE sequence or the second EKE sequence fails to authenticate, wherein a dual authentication procedure is implemented before any access is permitted by a user to the network-accessible system.

10. The system of claim 9, further comprising:
logic encoded on a computer readable medium that when executed on the console device provides the following function:
generating the device shared secret via an initial EKE sequence utilizing a default device identifier and associated default shared secret during an initial setup of the console device for connecting to the network-accessible system, wherein said device shared secret is utilized in place of said default device shared secret in subsequent console authentication procedures; and
logic encoded on the computer readable medium that when executed on the network-accesible system provides the following functions:
storing said device shared secret within a secure storage location of said network-accessible system; and
passing a copy of the device shared secret to the console device for secure storage therein, wherein said device shared secret is stored in a secure location on said console device and utilized along with a device ID of the console device during each subsequent connection of said console device to said network-accessible system.

11. The system of claim 10, further comprising logic encoded on a computer readable medium that when executed on the console device provides the functions of encrypting and decrypting a console operator's authentication data flowing between said console device and said network-accessible system utilizing a value selected from among said shared secret and a hash of said shared secret.

12. The system of claim 10, further comprising logic encoded on a computer readable medium that when executed on the console device provides the functions of encrypting and decrypting subsequent session data flowing between said console device and said network-accessible system utilizing a value selected from among a second secret generated by the second EKE sequence or a hash of said second secret.

13. The system of claim 10, further comprising logic encoded on a computer readable medium that when executed on the console device provides the following functions:
responsive to an establishment of a first console session that authenticates said console device, instantiating a second EKE sequence to authenticate a console operator utilizing a default user identifier and password;
enabling an update of the default user identifier and password to a new user identifier and password; and
storing said new user identifier and password in a secure storage location of said network-accessible system only, wherein said new user identifier and password are not stored on the console device.

14. The system of claim 13, further comprising logic encoded on a computer readable medium that when executed on the console device provides the following functions:
enabling a setup of multiple device identifiers and authorization levels for other devices to act as console devices;

storing said multiple device identifiers and authorization levels in said secure storage location; wherein said setup and storing of device identifiers and authorization levels are completed by an administrator of the network-accessible system; and enabling multiple console sessions for different systems on a single console device.

15. The system of claim 13, further comprising logic encoded on a computer readable medium that when executed on the console device provides the following functions:

enabling a setup of multiple operator user identifiers and associated passwords and authorization levels for other console operators to access console functions of the system; and storing said multiple operator user identifiers and associated passwords and authorization levels in said secure storage location;

wherein said setup and storing of operator user identifiers, associated passwords and authorization levels are completed by an administrator of the network-accessible system.

16. The system of claim 10, wherein said logic encoded on a computer readable medium for providing the function of passing a copy of the device shared secret further comprises logic that when executed on the console device provides one of the following functions:

when the console device includes an embedded smart chip, storing the copy of the device shared secret within the embedded smart chip, wherein the device shared secret is encrypted and maintained in a physically secure storage; and storing the copy of the device shared secret in encrypted format within the secure memory region of the console device, wherein said encrypted format utilizes a key generated from an operator-specified password.

17. A computer program product comprising:

a computer readable medium; and program code on said computer readable medium for providing secure access to console functions of a computer system by:

initiating a first EKE sequence between a console device and a network-accessible system to authenticate the console device as being authorized to connect to the network-accessible system to allow user access to the network-accessible system, wherein the initiating of a first EKE sequence includes checking whether a device shared secret generated during a previous access of the console device with the network-accessible system matches an associated shared secret stored on the network-accessible system to which a console operation is desired enabled;

when the device shared secret matches the associated shared secret, initiating a second EKE sequence between the console device and the network-accessible system to authenticate a userID and password of the user of the console device; and preventing access to the network-accessible system when either the first EKE sequence or the second EKE sequence fails to authenticate, wherein a dual authentication procedure is implemented before any access is permitted by a user to the network-accessible system.

18. The computer program product of claim 17, further comprising:

generating the device shared secret via an initial EKE sequence utilizing a default device identifier and associated default shared secret during an initial setup of the console device for connecting to the network-accessible system, wherein said device shared secret is utilized in place of said default device shared secret in subsequent console authentication procedures; and storing said device shared secret within a secure storage location of said network-accessible system; and passing a copy of the device shared secret to the console device for secure storage therein, wherein said device shared secret is stored in a secure location on said console device and utilized along with a device ID of the console device during each subsequent connection of said console device to said network-accessible system.

19. The computer program product of claim 18, further comprising program code for encrypting and decrypting a console operator's authentication data flowing between said console device and said network-accessible system utilizing a value selected from among said shared secret and a hash of said shared secret.

20. The computer program product of claim 18, further comprising program code for encrypting and decrypting subsequent session data flowing between said console device and said network-accessible system utilizing a value selected from among a second secret generated by the second EKE sequence or a hash of said second secret.

21. The computer program product of claim 18, further comprising program code for:

responsive to an establishment of a first console session that authenticates said console device, instantiating a second EKE sequence to authenticate a console operator utilizing a default user identifier and password;

enabling an update of the default user identifier and password to a new user identifier and password; and storing said new user identifier and password in a secure storage location of said network-accessible system only, wherein said new user identifier and password are not stored on the console device.

22. The computer program product of claim 21, further comprising program code for:

enabling a setup of multiple device identifiers and authorization levels for other devices to act as console devices;

storing said multiple device identifiers and authorization levels in said secure storage location; wherein said setup and storing of device identifiers and authorization levels are completed by an administrator of the network-accessible system; and enabling multiple console sessions for different systems on a single console device.

23. The computer program product of claim 21, further comprising program code for:

enabling a setup of multiple operator user identifiers and associated passwords and authorization levels for other console operators to access console functions of the system; and storing said multiple operator user identifiers and associated passwords and authorization levels in said secure storage location;

wherein said setup and storing of operator user identifiers, associated passwords and authorization levels are completed by an administrator of the network-accessible system.

24. The computer program product of claim 21, wherein said program code for passing a copy of the device shared secret comprises code for one of:

when the console device includes an embedded smart chip, storing the copy of the device shared secret within the embedded smart chip, wherein the device shared secret is encrypted and maintained in a physically secure storage; and storing the copy of the device shared secret in encrypted format within the secure memory region of the console device, wherein said encrypted format utilizes a key generated from an operator-specified password.

25. A method of signing in authenticated users to a console function of a system, comprising:

determining via a first EKE sequence whether a device identifier and associated shared secret of a system-attached device matches a stored device identifier and associated shared secret on said system;

responsive to both ends having identical shared secrets, initiating a second EKE sequence to determine whether a user-entered identifier and password matches a user identifier and password combination stored on a storage location of said system;

encrypting data transmitted during said second EKE sequence utilizing a shared secret generated during said first EKE sequence; and granting said user access to console functions of the system only when said second EKE sequence is successful, wherein no access is granted until both authentication processes of the first and second EKE sequences are successful.

26. The method of claim 25, further comprising subsequently generating a new device shared secret key following each successful first EKE sequence and passing the new device shared secret key to the console device for use in a next first EKE sequence, wherein the device shared secret is updated each time a session is established between the console device and the network environment.

27. A method for secure authentication of a system console device within a network environment, comprising:

establishing a first console session from an authentication device, wherein a default device identifier is utilized to initiate an EKE sequence between a network-attached console device and a, generating a shared secret key via an EKE sequence utilized to establish said first console session;

subsequently authenticating a console operator via a second EKE sequence, wherein said shared secret key is utilized to encrypt data of an authentication process for said console operator attempting to utilize said console operation; and subsequently generating a new device shared secret key following each successful first EKE sequence and passing the new device shared secret key to the console device for use in a next first EKE sequence, wherein the device shared secret is updated each time a session is established between the console device and the network environment.

* * * * *